United States Patent
Osawa (10) Patent No.: US 11,081,978 B2
(45) Date of Patent: Aug. 3, 2021

(54) VIBRATION TYPE MOTOR, LENS APPARATUS, AND ELECTRONIC DEVICE

(71) Applicant: CANON KABUSHIKI KAISHA, Tokyo (JP)

(72) Inventor: Kazuharu Osawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 408 days.

(21) Appl. No.: 16/198,023

(22) Filed: Nov. 21, 2018

(65) Prior Publication Data
US 2019/0165698 A1   May 30, 2019

(30) Foreign Application Priority Data
Nov. 27, 2017   (JP) .............................. JP2017-226419

(51) Int. Cl.
*H02N 2/06* (2006.01)
*H02N 2/02* (2006.01)
(Continued)

(52) U.S. Cl.
CPC .............. *H02N 2/065* (2013.01); *G02B 7/04* (2013.01); *H02N 2/006* (2013.01);
(Continued)

(58) Field of Classification Search
CPC ...... G05F 1/625; G06F 1/266; H02J 13/0005; H02J 13/00016; H02J 13/00; H02J 1/084; H02J 2310/60; Y02B 90/20
See application file for complete search history.

(56) References Cited

U.S. PATENT DOCUMENTS

2004/0047625 A1* 3/2004 Ito ..................... H04N 5/22521
                                                              396/429
2016/0246052 A1* 8/2016 Shimada ............ G02B 27/0006
(Continued)

FOREIGN PATENT DOCUMENTS

JP       07-184382 A     7/1995
JP    2011-254587 A    12/2011
(Continued)

OTHER PUBLICATIONS

The above foreign patent documents were cited in the Jun. 15, 2021 Japanese Office Action, which is unclosed without an English Translation, that issued in Japanese Patent Application No. 2017-226419.

*Primary Examiner* — Emily P Pham
(74) *Attorney, Agent, or Firm* — Cowan, Liebowitz & Latman, P.C.

(57) ABSTRACT

A vibration type motor includes a vibrator that includes a piezo element, a contacting portion, and a holding portion, and generates a first vibration and a second vibration, a friction member that makes frictional contact with the contacting portion of the vibrator, a holding member that holds the holding portion of the vibrator, and a biasing member that biases the holding portion of the vibrator to the holding member, and a condition of A3/A1<A4/A2 is satisfied where A1 and A2 are respectively amplitudes of the contacting portion in the first vibration and the second vibration, and A3 and A4 are respectively amplitudes of the holding portion in the first vibration and the second vibration in a state where the vibrator is not held by the holding member.

19 Claims, 9 Drawing Sheets

(51) Int. Cl.
*G02B 7/04* (2021.01)
*H02N 2/00* (2006.01)
*H02N 2/10* (2006.01)

(52) U.S. Cl.
CPC .......... *H02N 2/0015* (2013.01); *H02N 2/026* (2013.01); *H02N 2/103* (2013.01)

(56) References Cited

U.S. PATENT DOCUMENTS

2018/0096754 A1* 4/2018 Song .................. G03B 5/04
2018/0210194 A1* 7/2018 Nishiyama ................ B06B 1/06

FOREIGN PATENT DOCUMENTS

| | | | |
|---|---|---|---|
| JP | 2013-121190 | A | 6/2013 |
| JP | 2014-018027 | A | 1/2014 |
| JP | 2015-116020 | A | 6/2015 |
| JP | 2016-158386 | A | 9/2016 |
| JP | 2016-226175 | A | 12/2016 |
| WO | 2009/008135 | A1 | 1/2009 |

* cited by examiner

VIBRATION TYPE MOTOR, LENS APPARATUS, AND ELECTRONIC DEVICE

BACKGROUND OF THE INVENTION

Field of the Invention

The present invention relates to a vibration type motor usable for a lens barrel of a camera or the like.

Description of the Related Art

Vibration type motors are compact motors having high outputs and quietness, and for example, they are used for lens driving in interchangeable lenses of single-lens reflex cameras.

Japanese Patent Laid-open No. 2011-254587 discloses a vibration type driving apparatus in which two vibration modes are generated in a vibrator to generate an elliptical motion in a protrusion of the vibrator and this movement is converted into a driving force to drive a driven object. The vibrator disclosed in Japanese Patent Laid-open No. 2011-254587 is designed so that a holding portion becomes a node with less vibration in both of the two vibration modes. In the case of holding the holding portion serving as the node, the influence on the vibration mode is small, and a resonance frequency change of the state is small. Although driving characteristics of the vibration type driving apparatus varies according to a resonance frequency difference between the two vibration modes, the vibration type driving apparatus of Japanese Patent Laid-open No. 2011-254587 is designed such that the holding portion is the node to suppress the frequency change in holding the vibrator to suppress variation of the driving characteristics.

In the vibration type driving apparatus disclosed in Japanese Patent Laid-open No. 2011-254587, if the variation of the shape of the vibrator is small, the variation in the resonance frequency difference between the two vibration modes is small, and accordingly it is possible to suppress the variation in driving characteristics.

However, if the resonance frequency difference between the two vibration modes varies due to variation in shape of the vibrator caused by a lot difference or the like, there is a possibility that the variation in driving characteristics increases.

SUMMARY OF THE INVENTION

The present invention provides a vibration type motor, a lens apparatus, and an electronic device which area capable of reducing variations in driving characteristics.

A vibration type motor as one aspect of the present invention includes a vibrator including a piezo element, a contacting portion, and a holding portion, and configured to generate a first vibration and a second vibration, a friction member configured to make frictional contact with the contacting portion of the vibrator, a holding member configured to hold the holding portion of the vibrator, and a biasing member configured to bias the holding portion of the vibrator to the holding member, and a predetermined condition is satisfied.

A vibration type motor as another aspect of the present invention includes a vibrator including a piezo element, a contacting portion, and a holding portion, the vibrator being configured to generate a first vibration and a second vibration, a friction member configured to make frictional contact with the contacting portion of the vibrator, a holding member configured to hold the holding portion of the vibrator, and a biasing member configured to bias the holding portion of the vibrator to the holding member, and the holding portion is provided at a position that is a node of the first vibration and that is not a node of the second vibration.

An electronic device as another aspect of the present invention includes the vibration type motor and an object configured to be driven by the vibration type motor.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First Embodiment

Figure 1A:
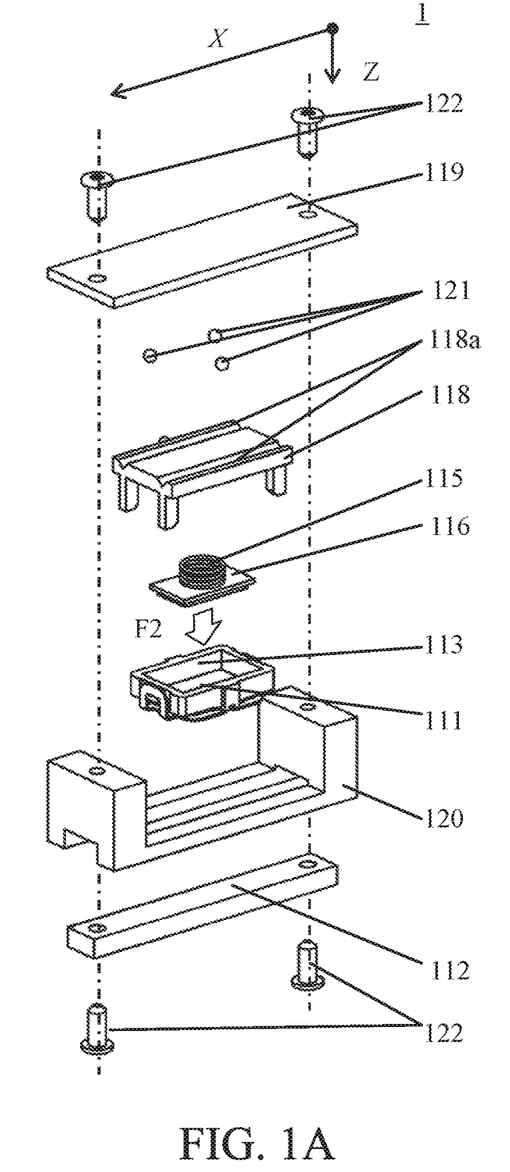
FIGS. 1A and 1B are exploded perspective views of a vibration type motor in a first embodiment.
Figure 1B:
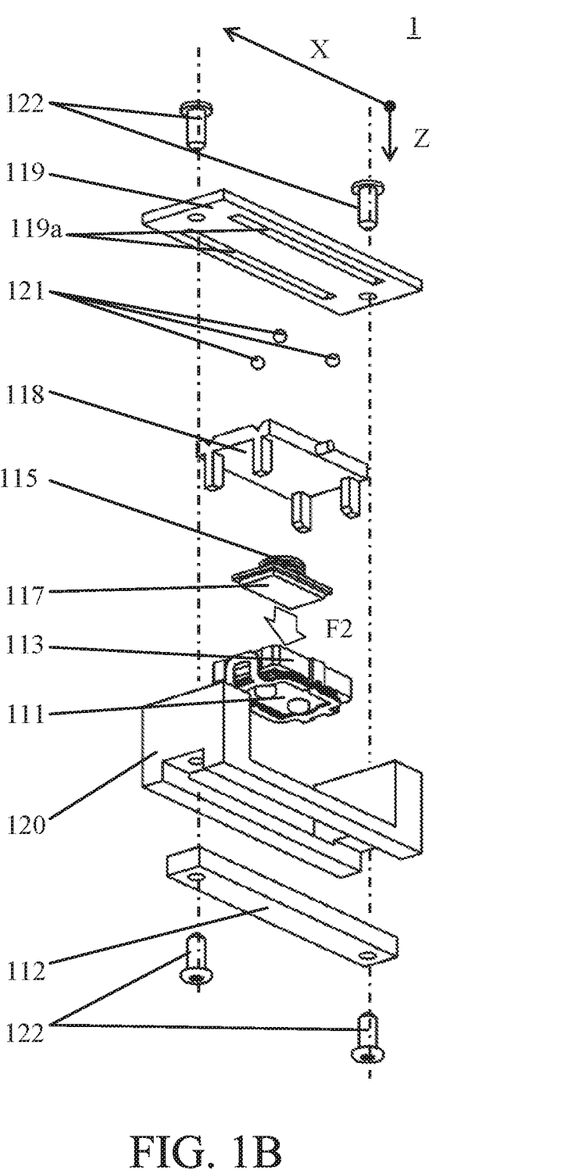

First, referring to FIGS. 1A and 1B, the configuration of a vibration type motor in a first embodiment of the present invention will be described. FIGS. 1A and 1B are exploded perspective views of a vibration type motor 1, and FIGS. 1A and 1B illustrate a case where the vibration type motor 1 is viewed from different directions. For example, the vibration type motor 1 can be used for driving a lens in a lens barrel of an image capturing apparatus requiring a small and high power motor, but the present invention is not limited thereto.

The vibration type motor 1 includes a vibrator 111, a friction member 112, a holding member (vibrator holding member) 113 that holds the vibrator 111, and a pressing unit that holds and presses the vibrator 111 and the friction member 112. The pressing unit includes a plurality of components such as a pressing member 115, a pressure plate 116, a buffer member 117, a movable frame 118, a guide member 119, a base member 120, a rolling member 121, and a fastening member 122. A groove 118a is formed on the movable frame 118, a groove 119a is formed on the guide member 119, and the groove 118a of the movable frame 118 and the groove 119a of the guide member 119 sandwich the rolling member 121.

Next, referring to FIGS. 2A to 2F, a vibration mode of the vibrator 111 of the vibration type motor 1 will be described.

Figure 2A:
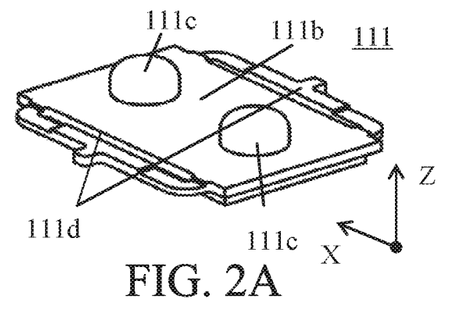
FIGS. 2A to 2F are explanatory diagrams of a vibration mode of the vibration type motor in the first embodiment.
Figure 2B:
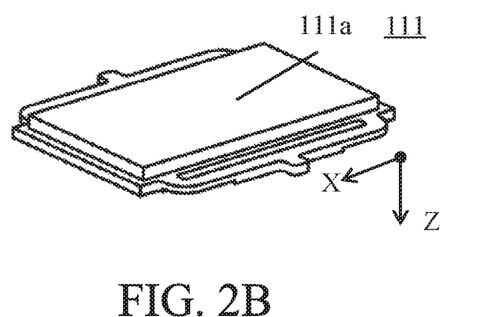

FIGS. 2A to 2F are explanatory diagrams of the vibration mode of the vibrator 111 of the vibration type motor 1. FIGS. 2A and 2B are perspective views of the vibrator 111 of the vibration type motor 1. The vibrator 111 is formed by pasting for example a plate-shaped piezoelectric element 111a and an elastic member 111b including two protrusions (contacting portions) 111c and a holding portion 111d. The piezoelectric element 111a is for example PZT (lead titanate zirconate), and the elastic member 111b is for example a metal such as stainless steel. The friction member 112 makes frictional contact with the protrusion 111c of the vibrator 111. When an appropriate AC voltage is applied to the piezoelectric element 111a, it is possible to generate an elliptical motion on the tip of the protrusion 111c as the contacting portion contacting the friction member 112.

In this embodiment, the vibrator 111 can perform the elliptical motion by generating a first vibration and a second vibration. The first vibration is a vibration in which the protrusion 111c is displaced in a driving direction (X axis direction) of the vibration type motor 1. The second vibration is a vibration in which the protrusion 111c is displaced in a direction orthogonal to the driving direction, that is, in a direction (Z axis direction) orthogonal to the contact surface of the friction member 112 contacting the protrusion 111c. However, this embodiment is not limited to this, and may be applied as vibrations in the opposite directions (that is, the first vibration displaces the protrusion 111c in the Z axis direction and the second vibration displaces it in the X axis direction).

Figure 2C:
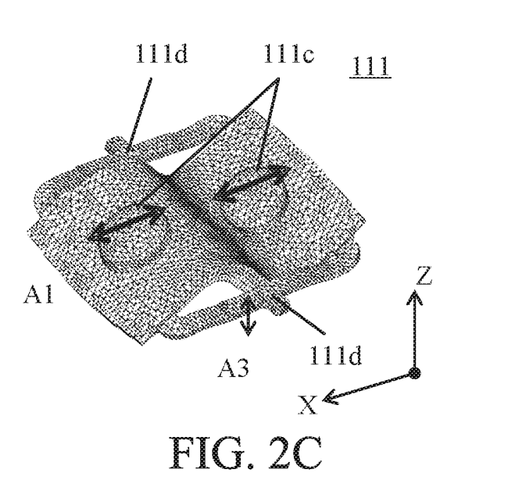
Figure 2D:
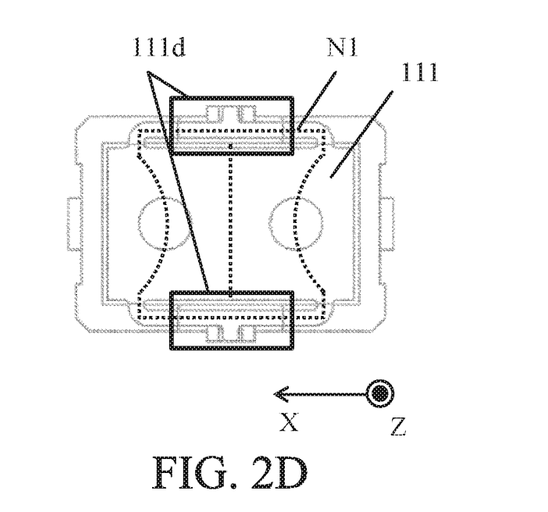
Figure 2E:
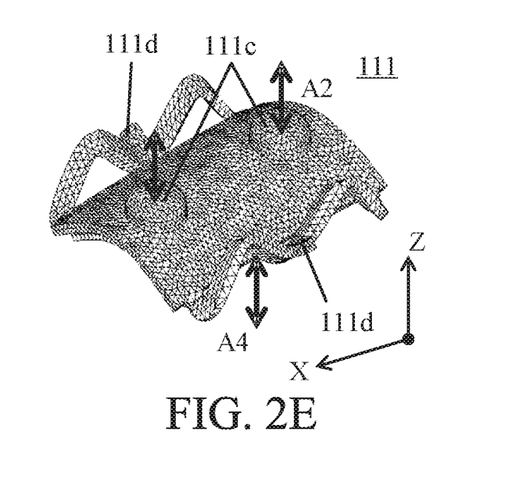

FIGS. 2C and 2E are perspective views illustrating the shape (vibration mode shape) of the vibrator 111 in the first vibration (first vibration mode) and the second vibration (second vibration mode), respectively. The first vibration is a vibration in which the tip of the protrusion 111c of the vibrator 111 is displaced in the driving direction X. The second vibration is a vibration in which the tip of the protrusion 111c of the vibrator 111 is displaced in the direction Z orthogonal to the contact surface of the friction member 112 contacting the protrusion 111c. By generating the first vibration and the second vibration in the vibrator 111 with an appropriate phase difference, the elliptical motion can be generated on the tip of the protrusion 111c.

Figure 2F:
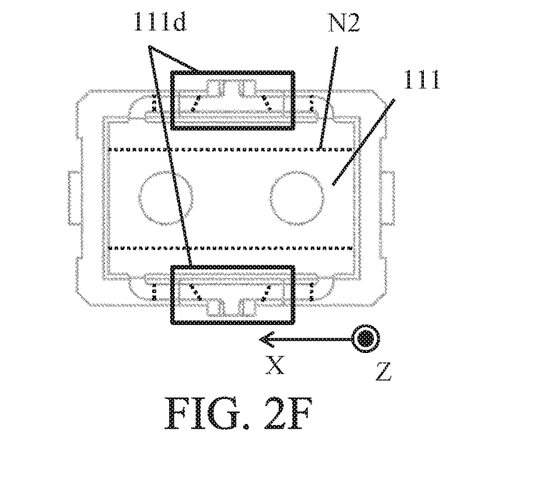

FIGS. 2D and 2F are explanatory diagrams of the position of the nodes of the first vibration and the second vibration, respectively. In this embodiment, in a state (single state, or first state) where the vibrator 111 is not held by the holding member 113, amplitudes of the protrusion 111c in the first vibration and the second vibration are assumed to be A1 and A2, respectively. Further, amplitudes (maximum amplitudes) of the holding portion 111d in the first vibration and the second vibration are assumed to be A3 and A4, respectively.

The node is a region in which the amplitude is sufficiently small with respect to the amplitudes A1 and A2 of the vibration of the protrusion 111c in each vibration (each vibration mode), and FIGS. 2D and 2F illustrates the node by dashed lines N1 and N2, respectively. As illustrated in FIG. 2D, the holding portion 111d of the vibrator 111 in the first vibration is a node in its entire region. Therefore, as illustrated in FIG. 2C, the amplitude A3 of the holding portion 111d is smaller than the amplitude A1 of the protrusion 111c. On the other hand, as illustrated in FIG. 2F, in the second vibration, the holding portion 111d of the vibrator 111 includes a region other than the node. Therefore, as illustrated in FIG. 2E, the amplitude A4 of the holding portion 111d is as large as the amplitude A2 of the protrusion 111c. For this reason, the amplitudes A1 to A4 satisfy a condition of $A3/A1 < A4/A2$ in the single state (first state). Preferably, the holding portion 111d is provided at a position of a node of the first vibration (position close to the node in the first vibration) and a position which is not a node in the second vibration (position away from the node of the second vibration).

Figure 3A:
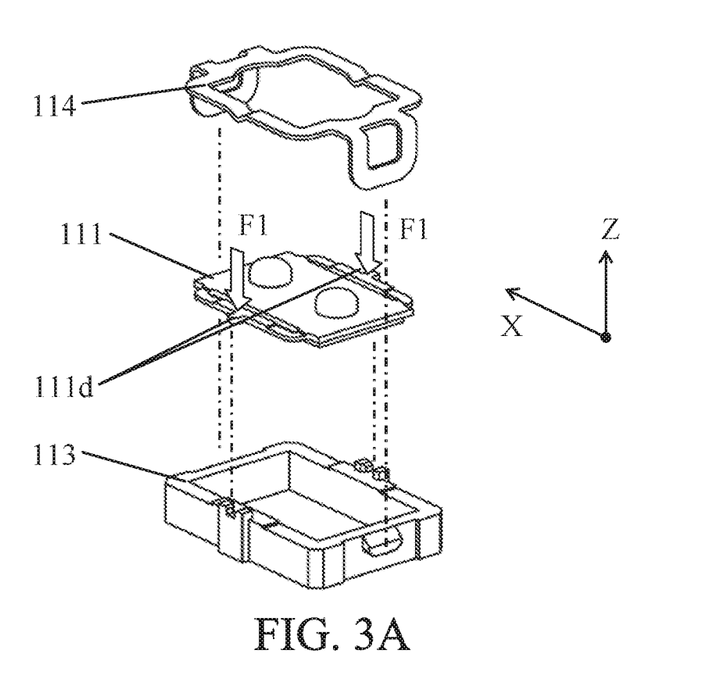
FIGS. 3A to 3C are explanatory diagrams of a method of holding a vibrator of the vibration type motor in the first embodiment.
Figure 3B:
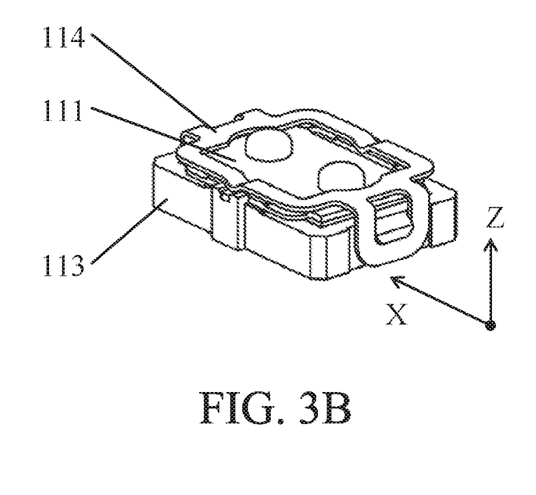
Figure 3C:
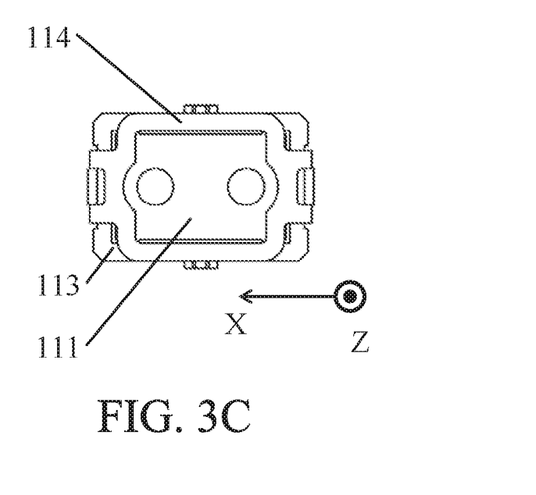

Next, referring to FIGS. 3A to 3C, a method of holding the vibrator 111 of the vibration type motor 1 will be described. FIGS. 3A to 3C are explanatory diagrams of the method of holding the vibrator 111. FIG. 3A is an exploded perspective view of a holding mechanism of the vibrator 111, FIG. 3B is a perspective view of the held vibrator 111, and FIG. 3C is a top view of the held vibrator 111. As illustrated in FIGS. 3A to 3 C, the vibration type motor 1 includes a plate spring (biasing member) 114 that biases the holding portion 111d of the vibrator 111 to the holding member 113. The plate spring 114 gives an appropriate biasing force F1 to the holding portion 111d by a reaction force of its elastic deformation. That is, the plate spring 114 biases the holding portion 111d of the vibrator 111 to the holding member 113 with a predetermined biasing force (biasing force F1) so that the vibrator 111 is held by the holding member 113.

As illustrated in FIGS. 1A and 1B, a compression coil spring (pressing member) 115 presses the vibrator 111 by the reaction force (pressing force F2) of the elastic deformation to press the protrusion 111c, of the vibrator 111 to make contact with the friction member 112. In this case, a pressure plate 116 and a felt (buffer member) 117 are arranged between the compression coil spring 115 and the vibrator 111 in order to transmit only the pressing force F2 to the vibrator 111 without interfering with the vibration of the vibrator 111.

The movable frame 118 constrains the holding member 113 so as to be movable in a direction of the pressing force F2 and so as not to be movable in the driving direction X. The groove 118a in which the rolling member 121 is disposed is formed on the movable frame 118. The groove 11a is formed in the guide member 119 similarly to the movable frame 118. By sandwiching the rolling member 121 between the groove 118a of the movable frame 118 and the groove 119a of the guide member 119, the movable frame 118, the holding member 113, and the vibrator 111 are guided to be movable only in the driving direction X with respect to the guide member 119. The base member 120 is a casing of the vibration type motor 1, and the friction member 112 and the guide member 119 are fixed by screws (fastening members) 122.

With such a configuration, when the vibrator 111 vibrates and an elliptical motion occurs at the protrusion 111c, a driving force is generated in the driving direction X at the contact surface between the protrusion 111c and the friction member 112. At this time, the vibrator 111, the holding member 113, the biasing member 114, the pressing member 115, the pressing plate 116, the buffer member 117, and the movable frame 118 are integrally driven in the driving direction X in a straight line.

Figure 9A:
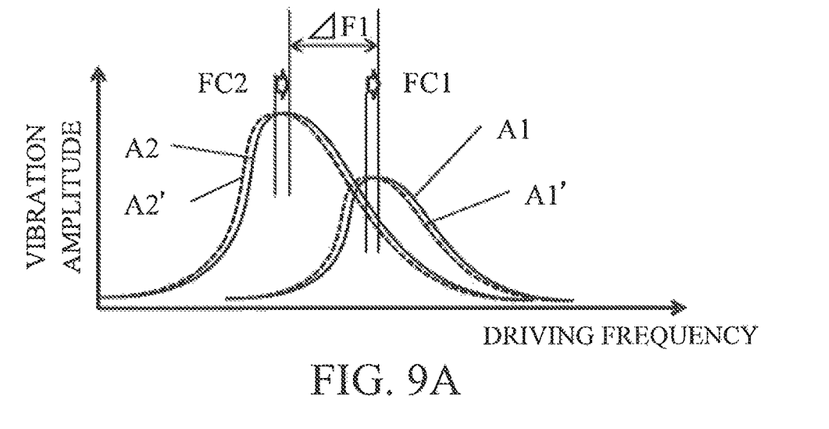
FIGS. 9A to 9C are characteristic diagrams of a vibration type motor as a comparative example.
Figure 9B:
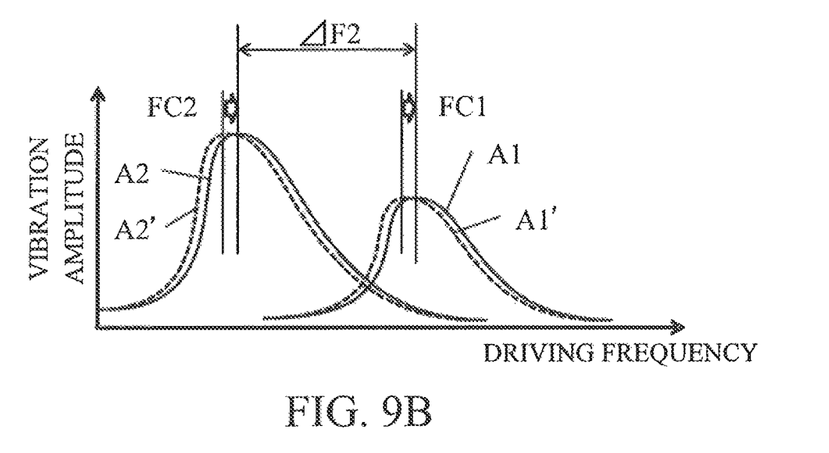

Next, the features and effects of the vibration type motor 1 will be described. First, referring to FIGS. 9A to 9C, characteristics of a vibration type motor as a comparative example will be described. FIGS. 9A and 9B are diagrams illustrating the relationship between the driving frequency for vibrating the vibrator in the vibration type motor as the comparative example and the vibration amplitude at the protrusion tip of the vibrator. In FIGS. 9A and 9B, the horizontal axis represents the driving frequency, and the vertical axis represents the vibration amplitude. Also, in FIGS. 9A and 9B, dashed lines A1' and A2' are characteristics of a single state of the vibrator in the first vibration and the second vibration, respectively. Solid lines A1 and A2 are characteristics of the vibrator in a held state. Symbols FC1 and FC2 denote change amounts of resonance frequencies of the first vibration and the second vibration of the vibrator in the held state with respect to the single state of the vibrator. FIG. 9A illustrates a case where a resonance frequency difference ΔF1 between the first vibration and the second vibration is an appropriate value and FIG. 9B illustrates a resonance frequency difference ΔF2 between the first vibration and the second vibration is an inappropriate value due to for example variation of the shape of the vibrator, respectively. In the vibrator of the comparative example, the holding portion is designed to be a node with less vibration in both of the first vibration and the second vibration. In the case of holding a part with less vibration, the influence on the vibration mode is small, and the change amounts FC1 and FC2 of the resonance frequencies are very small.

Figure 9C:
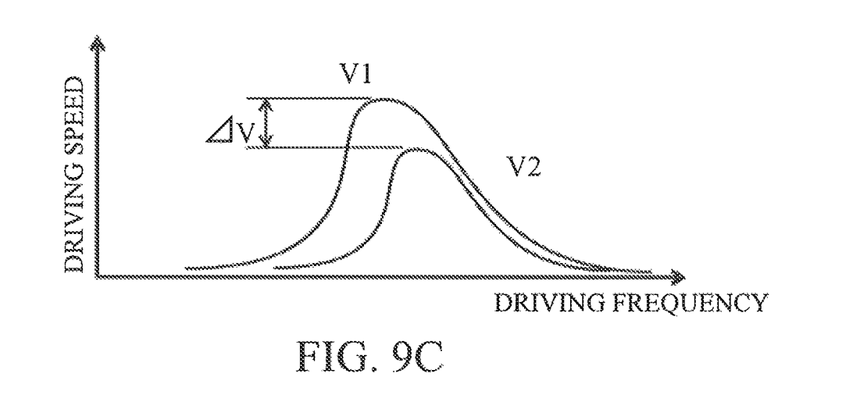

FIG. 9C illustrates the relationship between the driving frequency for vibrating the vibrator in the vibration type motor as the comparative example and the driving speed of the vibration type motor. Symbols V1 and V2 denote driving characteristics when the vibrator having the frequency distribution illustrated in FIGS. 9A and 9B is used, respectively. When the resonance frequency difference between the first vibration and the second vibration is not appropriate, the performance of the vibration type motor greatly deteriorates. For this reason, in FIG. 9C, the characteristics may be deteriorated as indicated by the driving characteristic V2, and as a result, the variation ΔV of the driving characteristics (driving speed) may increase.

On the other hand, the vibration type motor 1 of this embodiment satisfies the condition of A3/A1<A4/A2 where A1 and A2 are amplitudes of the tips of the protrusions 111c in the first vibration and the second vibration in the single state, and A3 an A4 are maximum amplitudes of the holding portions 111d in the first vibration and the second vibration in the single state. Further, the holding portion 111d of the vibration type motor 1 is biased to be held by the holding member 113 by the biasing force F1 generated by the biasing member 114.

Figure 4A:
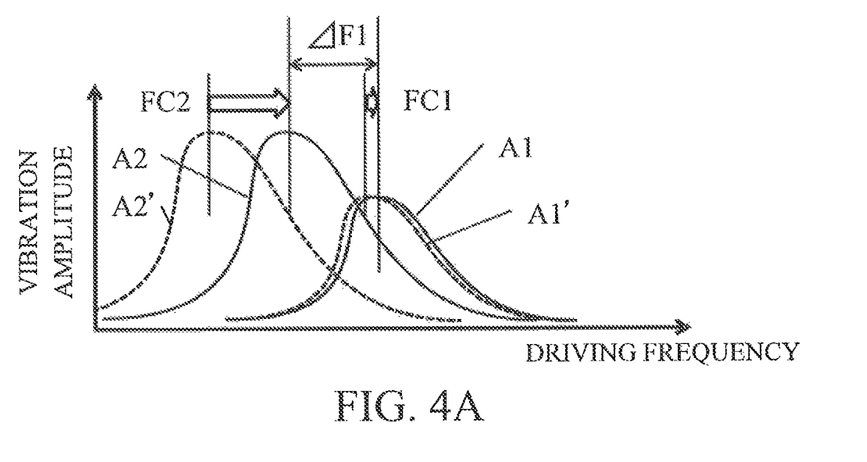
FIGS. 4A to 4C are characteristic diagrams of the vibration type motor in the first embodiment.
Figure 4B:
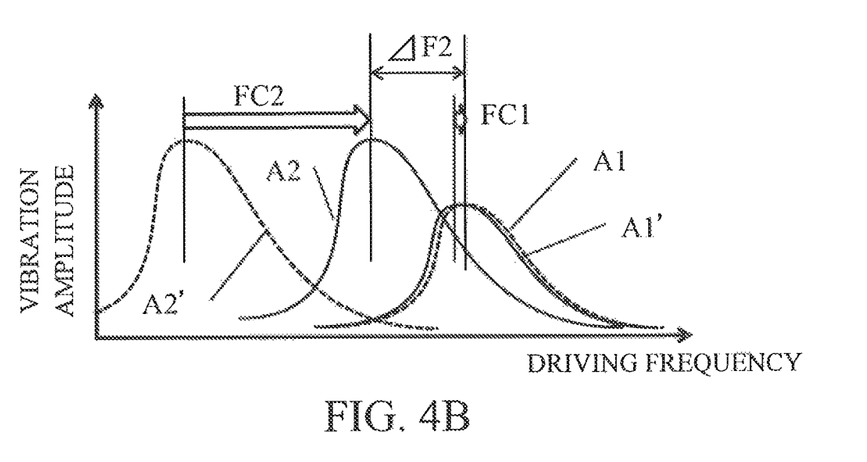
Figure 4C:
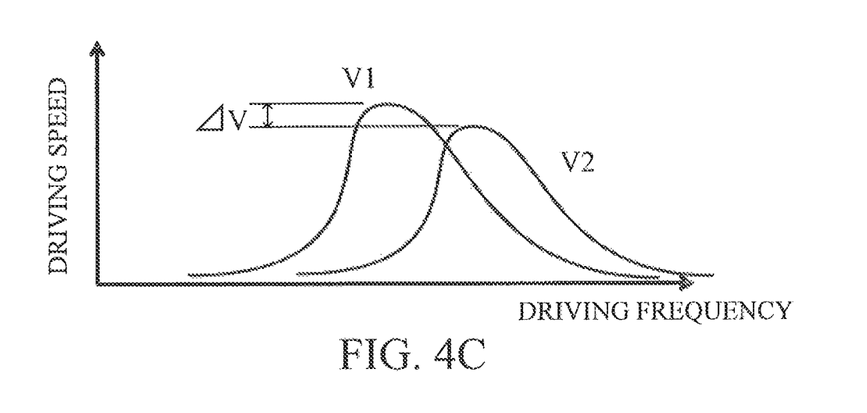

Next, referring to FIGS. 4A to 4C, characteristics of the vibration type motor 1 in this embodiment will be described. FIGS. 4A and 4B are diagrams illustrating the relationship between the driving frequency for vibrating the vibrator 111 of the vibration type motor 1 and the vibration amplitude at the tip of the protrusion 111c of the vibrator 111. In FIGS. 4A and 4B, the horizontal axis represents the driving frequency, and the vertical axis represents the vibration amplitude.

In this embodiment, since the holding portion 111d has a large vibration in the second vibration, it is greatly influenced by the holding, and the change amount FC2 of the resonance frequency of the second vibration in the held state with respect to the single state of the vibrator 111 is large. Further, since the change amount FC2 of the resonance frequency increases as the holding portion 111d is strongly restrained, the change amount FC2 of the peak frequency can be adjusted by adjusting the biasing force F1 of the plate spring 114. FIGS. 4A and 4B illustrate an example in which the resonance frequency difference between the first vibration and the second vibration is different in the single state of the vibrator 111. Even when the resonance frequency difference is different in this example, the variation amount FC2 of the peak frequency of the second vibration can be adjusted by adjusting the biasing force F1 of the plate spring 114. As a method of adjusting the biasing force F1, for example, there is a change in plate thickness of the plate spring 114 or a change in deformation amount of elastic deformation. Accordingly, the resonance frequency differences ΔF1 and ΔF2 in the first vibration and the second vibration, respectively, can be set to appropriate values while the vibrator 111 is held by the holding member 113.

Next, effects of the vibration type motor 1 in this embodiment will be described. In the vibration type motor 1 of this embodiment, even when the shape of the vibrator 111 varies due to the above-described action, the resonance frequency differences ΔF1 and ΔF2 in the first vibration and the second vibration, respectively, can be set to appropriate values. For this reason, according to this embodiment, as can be understood by comparing FIG. 9C of the comparative example with FIG. 4C of this embodiment, it is possible to provide a vibration type motor in which the variation ΔV of the driving characteristic (driving speed) is suppressed (reduced).

In this embodiment, a state where the vibrator 111 is held by the holding member 113 is referred to as a held state (second state). In order to appropriately adjust the resonance frequency differences ΔF1 and ΔF2 of the first vibration and the second vibration in the held state, respectively, it is preferred that the change amounts FC1 and FC2 of the resonance frequency are adjusted as follows. That is, it is preferred that one of the change amounts FC1 and FC2 of the resonance frequency of the first vibration and the second vibration in the held state (second state) is small and the other is large compared with the single state (first state). For example, the amplitude A4 of the holding portion 111d in the second vibration is arranged to be larger, and the change amount FC2 is adjusted so that the change amount FC2 of the resonance frequency in the second vibration is equal to or more than twice the change amount FC1 of the resonance frequency in the first vibration, and thus the adjustment becomes easy. Accordingly, it is preferred that the change amount FC2 of the resonance frequency between the single state (first state) and the held state (second state) in the second vibration is equal to or more than twice the change amount FC1 of the resonance frequency between the single state and the held state in the first vibration.

As illustrated in FIG. 3C, the plate spring 114 overlaps with at least a part of each of the vibrator 111 and the holding member 113 when viewed in a direction Z orthogonal to the contact surface of the friction member 112 contacting the protrusion 111c. With such a configuration, the plate spring 114 can be disposed without enlarging the vibrator holding mechanism in the direction orthogonal to the Z direction in FIG. 3C, and the vibration type motor 1 can be miniaturized, which is preferable.

In this embodiment, the driving principle of the vibrator 111, the holding guide structure of the vibrator 111 and the friction member 112, or the material of each member is not limited to the above description. Further, the vibration mode in which the protrusion 111c is displaced in the driving direction (X axis direction) is defined as the first vibration, and the vibration in which the protrusion 111c is displaced in the pressing direction (Z axis direction) between the vibrator 111 and the friction member 112 is defined as the second vibration, but the first vibration and the second vibration may be defined inversely with each other.

Second Embodiment

Figure 5A:
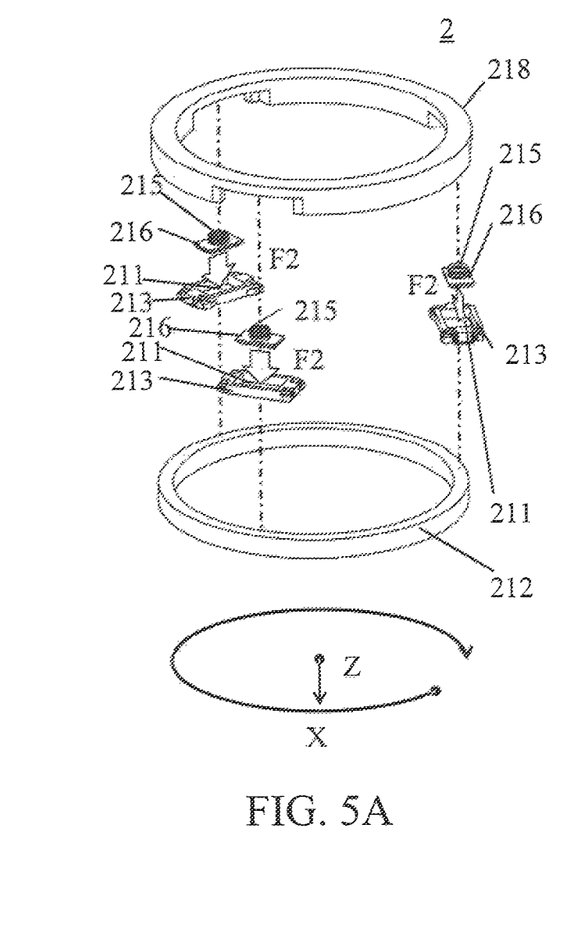
FIGS. 5A and 5B are exploded perspective views of a vibration type motor in a second embodiment.
Figure 5B:
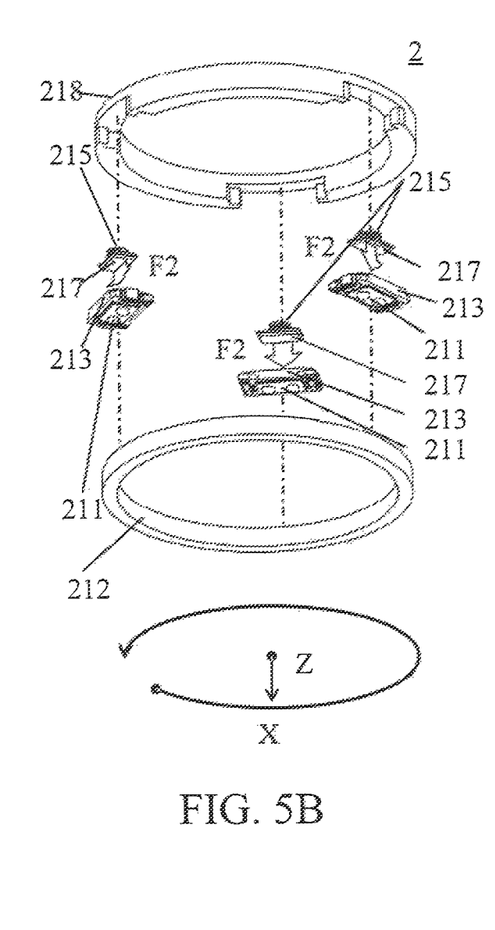

Next, referring to FIGS. 5A and 5B, the configuration of a vibration type motor in a second embodiment of the present invention will be described. FIGS. 5A and 5B are exploded perspective views of a vibration type motor 2, and FIGS. 5A and 5B illustrate a case where the vibration type motor 2 is viewed from different directions.

Similarly to the vibration type motor 1, the vibration type motor 2 includes a vibrator 211, a friction member 212, a holding member (vibrator holding member) 213 that holds the vibrator 211, and a pressuring unit that holds and presses the vibrator 211 and the friction member 212. The pressing unit includes a plurality of parts such as a pressing member 215, a pressing plate 216, a buffer member 217, a fixed frame 218.

Similarly to the first embodiment, the vibrator 211 includes a protrusion 211c and a holding portion 211d. The ratio of the amplitude of the holding portion 211d to the amplitude of the tip of the protrusion 211c in the second vibration is larger than the ratio of the amplitude of the holding portion 211d to the amplitude of the tip of the protrusion 211c in the first vibration. In the vibration type motor 2, the first vibration is a vibration in which the tip of the protrusion 211c is displaced in the direction Z orthogonal to the contact surface of the friction member 212 with the protrusion 211c, and the second vibration is vibration in which the tip of the protrusion 211c is displaced in the driving direction X.

Figure 6A:
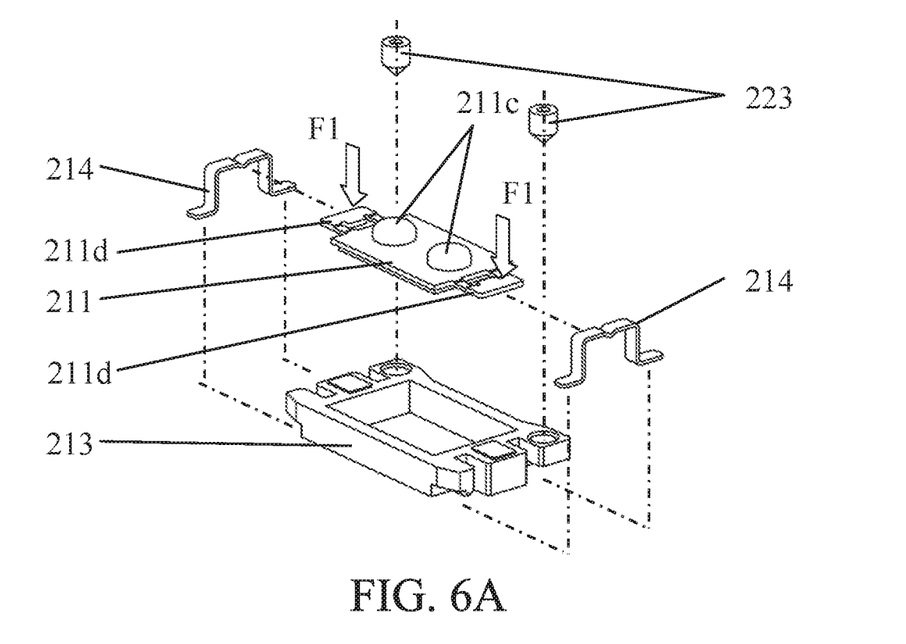
FIGS. 6A to 6C are explanatory diagrams of a method of holding the vibrator of the vibration type motor in the second embodiment.
Figure 6B:
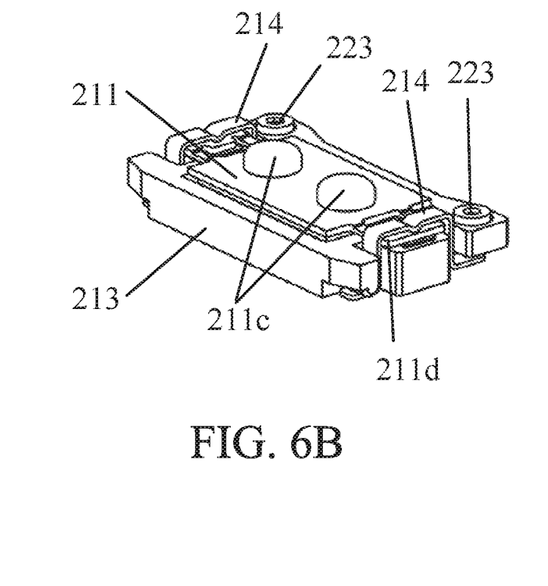
Figure 6C:
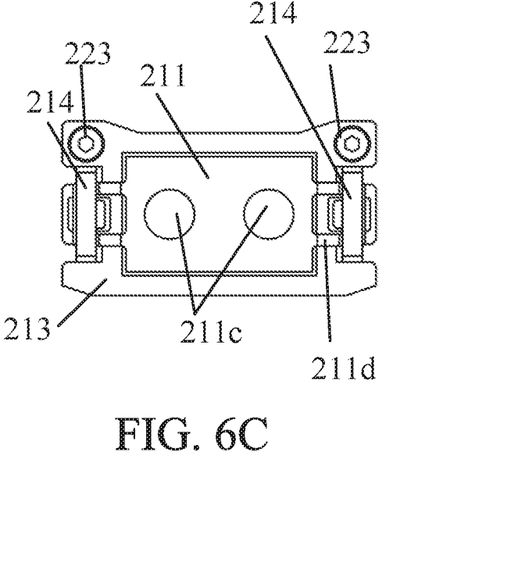

Next, referring to FIGS. 6A to 6C, a method of holding the vibrator 211 of the vibration type motor 2 will be described. FIGS. 6A to 6C are explanatory diagrams of the method of holding the vibrator 211. FIG. 6A is an exploded perspective view of the holding mechanism of the vibrator 211, FIG. 6B is a perspective view of the held vibrator 211, and FIG. 6C is a top view of the held vibrator 211. As illustrated in FIGS. 6A to 6C, a plate spring (biasing member) 214 is disposed on the vibrator 211 disposed on the holding member 213, and a biasing force F1 is applied appropriately to the holding portion 211d by a reaction force of elastic deformation of the plate spring 214. By the biasing force F1, the holding portion 211d of the vibrator 211 is held by the holding member 213. Further, the vibration type motor 2 includes a set screw (adjusting member) 223 that adjusts the biasing force F1 of the plate spring 214. A thread portion of the outer periphery of the set screw 223 is engaged with the holding member 213, and the tip of the set screw 223 is in contact with the plate spring 214. By adjusting a screwing amount of the set screw 223 while controlling torque, the biasing force F1 by the plate spring 214 can be adjusted. Since the pressing member 215, the pressing plate 216, and the buffer member 217 are the same as the respective members of the first embodiment, explanations thereof are omitted.

In FIGS. 5A and 5B, the fixed frame 218 restrains the holding member 213 so that the holding member 213 can move in a direction of the pressing force F2 and it cannot move in the driving direction X. With such a configuration, when the vibrator 211 vibrates and an elliptical motion occurs on the protrusion 211c, a driving force is generated in the driving direction X on a contact surface between the protrusion 211c and the friction member 212. At this time, the friction member 212 is rotationally driven in the driving direction X.

Next, the features and effects of the vibration type motor 2 will be described. The vibration type motor 2 of this embodiment satisfies the condition of A3/A1<A4/A2 where A1 and A2 are amplitudes of the tips of the protrusions 211c in the first vibration and the second vibration in the single state of the vibrator 211, and A3 an A4 are maximum amplitudes of the holding portions 211d in the first vibration and the second vibration in the single state. Further, the holding portion 211d of the vibration type motor 2 is biased to be held by the holding member 213 by the biasing force F1 generated by the biasing member 214. Further, the vibration type motor 2 includes the set screw 223, and it is possible to adjust the biasing force F1 by the biasing member 214. By adjusting the biasing force F1 using the set screw 223, it is possible to adjust the change amount of the resonance frequency between the single state (first state) and the held state (second state) in the second vibration.

In the vibration type motor 2, for example, even in the case where the shape of the vibrator 211 varies, similarly to the first embodiment, the peak frequency difference between the first vibration and the second vibration of the vibrator 211 can be adjusted to an appropriate value. While in the first embodiment, the biasing force F1 is adjusted by the shape of the plate spring, in the vibration type motor 2 of this embodiment, the beak frequency difference between the first vibration and the second vibration can be adjusted by using the set screw 223 that adjusts the biasing force F1 with higher accuracy.

According to the vibration type motor 2 of this embodiment, similarly to the first embodiment, the variation in driving characteristics can be suppressed (reduced). In addition, since the vibration type motor 2 can adjust the peak frequency difference between the first vibration and the second vibration with high accuracy as compared with the vibration type motor 1, it is possible to further reduce the variation in driving characteristics. In this embodiment, similarly to the first embodiment, it is preferred that the change amount of the resonance frequency between the single state and the held state in the second vibration is equal to or more than twice the change amount in the first vibration. Further, in this embodiment, similarly to the first embodiment, it is preferred that the plate spring 214 overlaps with each of the vibrator 211 and the holding member 213 when viewed from the direction (Z axis direction) orthogonal to the contact surface of the friction member 212 with the protrusion 211c.

In this embodiment the driving principle of the vibrator 211, the holding guide structure of the vibrator 211 and the friction member 212, or the material of each member is not limited to the above description. Further, the vibration mode in which the protrusion 211c is displaced in the driving direction (X axis direction) is defined as the second vibration, and the vibration in which the protrusion 211e is displaced in the pressing direction (Z axis direction) between the vibrator 211 and the friction member 212 is defined as the second vibration, but the first vibration and the second vibration may be defined inversely with each other.

Third Embodiment

Figure 7A:
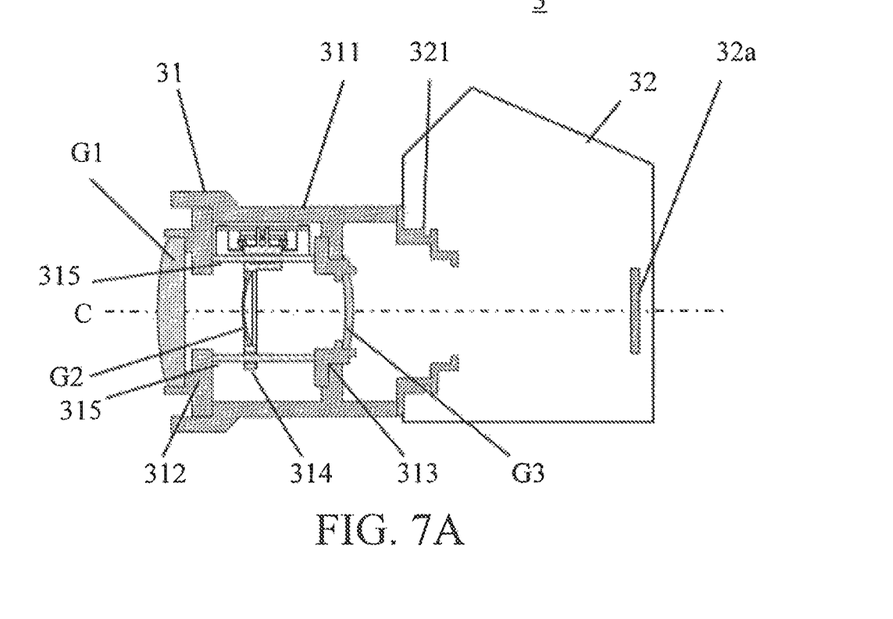
FIGS. 7A and 7B are configuration diagrams of an image capturing apparatus in a third embodiment.
Figure 7B:
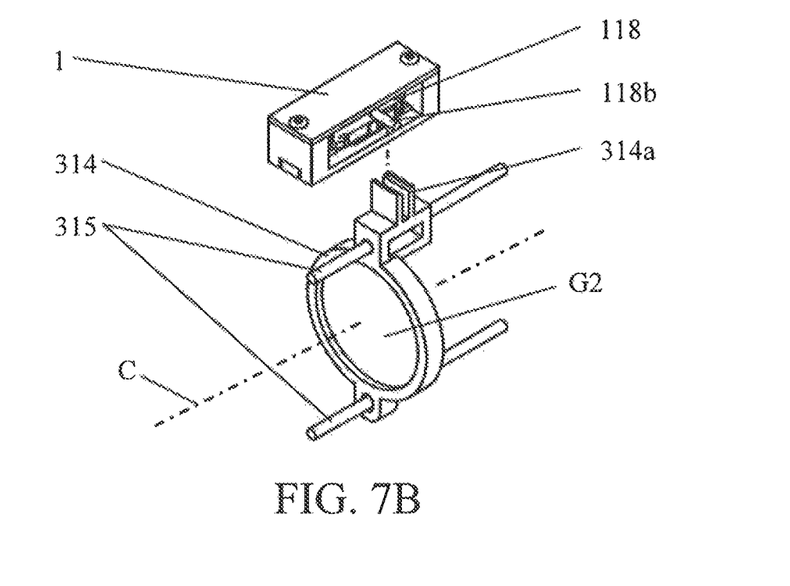

Next, referring to FIGS. 7A and 7B, an image capturing apparatus in a third embodiment of the present invention will be described. FIGS. 7A and 7B are configuration diagrams of an image capturing apparatus 3. FIG. 7A illustrates a cross-sectional view of the image capturing apparatus 3, and FIG. 7B illustrates an exploded perspective view of a main part of the image capturing apparatus 3. The image capturing apparatus 3 includes the vibration type motor 1 of the first embodiment. The image capturing apparatus 3 includes a camera body (image capturing apparatus body) 32 and a lens barrel (lens apparatus) 31 detachably attached to the camera body 32. However, this embodiment is not limited to this, and the present invention is also applicable to an image capturing apparatus in which a camera body and a lens barrel are integrally formed.

The camera body 32 is provided with an image sensor 32a. The image sensor 32a includes a CMOS sensor or a CCD sensor, and it photoelectrically converts an optical image (object image) formed via an image capturing optical system (lenses G1, G2, and G3) of the lens barrel 31 to output image data. A mount 321 of the camera main body 32 includes a bayonet portion for attaching the lens barrel 31 to the camera body 32.

The lens barrel 31 includes a fixed barrel 311, and it is in contact with a flange portion of the mount 321. The fixed barrel 311 and the mount 321 are fixed to a screw (not illustrated). In the fixed barrel 311, a front barrel 312 that holds the lens G 1 and a rear barrel 313 that holds the lens G3 are fixed. Further, the lens barrel 31 includes a lens holding frame 314 that holds the lens G2. The lens holding frame 314 is held so as to be movable rectilinearly by a guide bar 315 held by the front barrel 312 and the rear barrel 313. The vibration type motor 1 is fixed to the rear barrel 313 with screws (not illustrated) or the like.

FIG. 7B illustrates the vibration type motor 1, the lens G2, the lens holding frame 314, and the guide bar 315 which are main parts of the image capturing apparatus 3. A shaft 118b that transmits the driving force to the outside is provided in a movable frame 118 of the vibration type motor 1, and it engages with an engaging portion 314a of the lens holding frame 314. With such a configuration, when the vibrator 111 of the vibration type motor 1 vibrates, the driving force of the vibration type motor 1 is transmitted to the lens holding frame 314 via the movable frame 118. The lens holding frame 314 is linearly moved while being guided by the guide bar 315.

As described above, in this embodiment, the lens barrel 31 can drive the image capturing optical system (lens G2) along the optical axis C by using the vibration type motor 1. By using the vibration type motor 1 in which variation of driving characteristics is suppressed, stable lens driving can be performed. According to this embodiment, it is possible to provide a lens apparatus and an image capturing apparatus that suppress the variation in driving characteristics of the image capturing optical system (lens).

Fourth Embodiment

Figure 8:
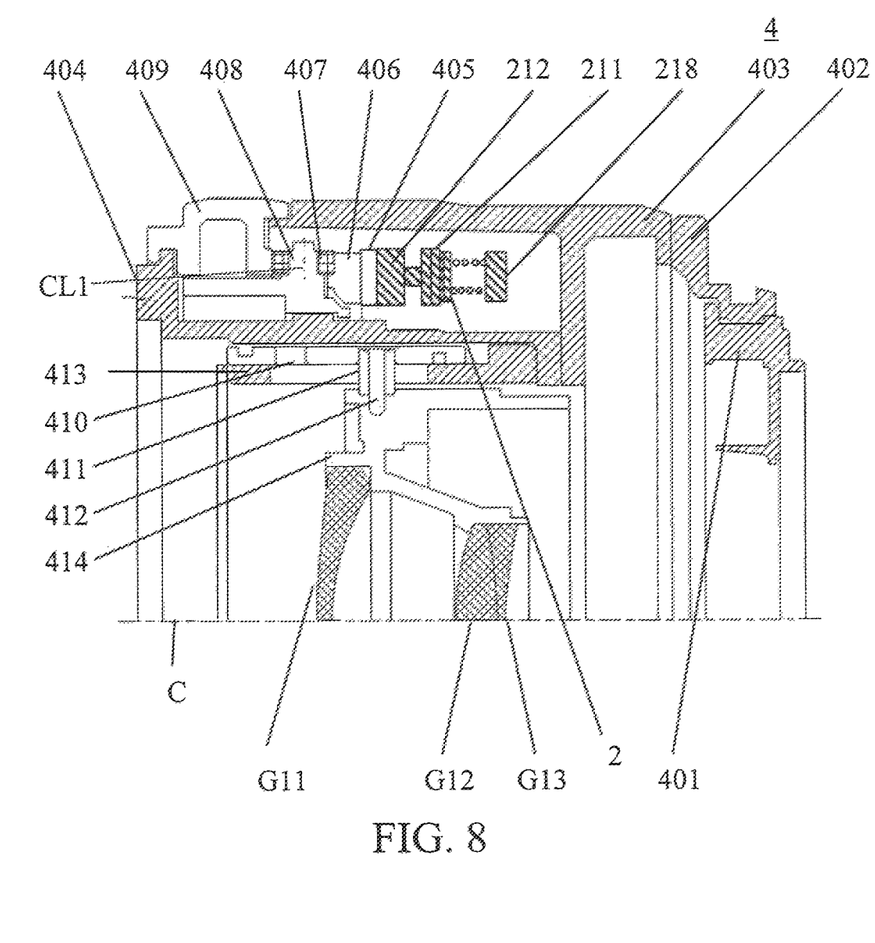
FIG. 8 is a cross-sectional view of a lens apparatus in a fourth embodiment.

Next, referring to FIG. 8, a lens apparatus (lens barrel) in a fourth embodiment of the present invention will be described. FIG. 8 is a cross-sectional view of a lens barrel 4. The lens barrel 4 includes the vibration type motor 2 of the second embodiment. The lens barrel 4 is detachably attached to an image capturing apparatus (not illustrated).

The vibration type motor 2 is provided as an actuator that drives focus lens units G11, G12, and G13 of the lens barrel 4. Since the lens barrel 4 is substantially rotationally symmetric around the optical axis C (rotational center axis of the actuator) of the lens barrel 4, only the upper half is illustrated in FIG. 8. Further, in order to avoid complication of the drawing, lenses other than the focus lens units G11, G12, and G13 and a lens barrel are omitted, in this embodiment, the lens barrel 4 is a lens barrel detachably mounted to an interchangeable lens type camera body. However, this embodiment is not limited to this, and the present invention is also applicable to a lens barrel configured integrally with a camera body.

The lens barrel 4 includes the vibration type motor 2, fixed barrels 401, 402, 403, and 404, a buffer member 405, a rotation member 406, a rotation roller 407, and a rotation roller holding member 408. Further, the lens barrel 4 includes a focusing member 409, a cam barrel 410, a shaft member 411, a screw 412, a fixed barrel 413, a lens holding frame (lens holding member) 414, and the focus lens units G11, G12, and G13.

In FIG. 8, the vibration type motor 2 includes a friction member 212 as a movable portion that is capable of performing rotational driving around the optical axis C as a rotation center, and other members (a vibrator 211, a fixed frame 218, and the like) as a fixed portion that is incapable of performing rotational driving. The fixed barrels 401, 402, 403, and 404 constituting a body of the lens barrel 4 are connected by screws (not illustrated). The fixed barrel 403 holds the fixed frame 218 of the vibration type motor 2, and the fixed barrel 404 holds the friction member 212 as a movable portion in a rotatable state.

The buffer member 405 is fixed to the friction member 212 and rotates integrally with the friction member 212. The rotation member 406 also rotates integrally with the friction member 212 and the buffer member 405. The rotation roller 407 rotates around the center line CL1 as a rotation center and it is in contact with the rotation member 406 that rotates integrally with the friction member 212. The rotation roller holding member 408 rotatably holds the rotation roller 407 and rotates around the optical axis C as a rotation center. The focusing member 409 is directly operable by a user and rotates around the optical axis C as a rotation center.

The cam barrel 410 includes a cam groove and is connected to the rotation roller holding member 408 via a groove (not illustrated) formed in the fixed barrel 404, and at the same time, it rotates around the optical axis C as the rotation center. The shaft member 411 is engaged with a cam groove of the cam barrel 410 and fixed to the lens holding frame 414 by screws 412, The fixed barrel 413 includes a rectilinear groove and is fixed to the fixed barrel 404. Further, the fixed barrel 413 is engaged with the shaft member 411 in the rectilinear groove, and the shaft member 411 moves rectilinearly in the rectilinear groove by the rotational movement of the cam barrel 410. The lens holding frame 414 holds the focus lens units G11, G12, and G13, and it is movably arranged linearly with respect to the fixed barrel 413 by the shaft member 411. Although the lens holding frame 414 is illustrated as being held by one shaft member 411, it may be held by three or more shaft members arranged at substantially equal intervals.

When the friction member 212 of the vibration type motor 2 rotates, the rotation member 406 also rotates in conjunction with the rotation of the friction member 212, and accordingly the rotation roller 407 rolls. At this time, the focusing member 409 is stopped by friction with the fixed barrels 403 and 404. At that time, along with the rolling of the rotation roller 407, the rotation roller holding member 408 rotates around the optical axis C, and the lens holding frame 414 linearly moves via the cam barrel 410 and the fixed barrel 413. On the other hand, when the focusing member 409 is operated, the friction member 212 of the vibration type motor 2 is stopped by friction, and the rotation member 406 that is conjunction with it also stands still. At that time, similarly to the case where the friction member 212 is rotated by the vibration type motor 2, the lens holding frame 414 can be linearly moved by the rolling of the rotation roller 407.

As described above, the lens barrel 4 of this embodiment includes the lens holding frame 414, the fixed barrel 413, and the cam barrel 410. The lens holding frame 414 holds the focus lens units G11, G12, and G13 (image capturing optical system) and includes an engaged portion (shaft member 411). The fixed barrel 413 is a guide mechanism that linearly guides the lens holding frame 414 in the direction along the optical axis C (optical axis direction). The cam barrel 410 is a cam mechanism including the cam groove engaged with the engaged portion. The cam mechanism is indirectly rotated via the plurality of parts by the vibration type motor 2 that preforms the rotational driving, and it drives the focus lens units G11, G12, and G13 in the optical axis direction. By using the vibration type motor 2, the lens barrel 4 of this embodiment can suppress the variation in driving characteristics.

The lens barrel 4 indirectly transmits the driving force of the vibration type motor 2 to the cam mechanism via the plurality of parts to rotate the cam mechanism, but the present invention is not limited thereto. For example, the friction member 212 of the vibration type motor 2 may be directly fixed to the cam barrel 410 to directly drive the cam mechanism.

According to each of the embodiments, it is possible to provide a vibration type motor, a lens apparatus, and an electronic device which are capable of reducing variations in driving characteristics.

In the third embodiment and the fourth embodiment, the image capturing optical system (lens) is driven by the vibration type motor, but components other than the image capturing optical system in the image capturing apparatus may be driven. For example, the vibration type motor described above may be used to drive the image sensor in a direction orthogonal to the optical axis of the image capturing optical system with the image sensor as a driving target. In addition, an electronic device to which the present invention can be applied is not limited to the image capturing apparatus, but the vibration type motor described above may be used for driving components in the electronic device other than the image capturing apparatus with the components as the driving target.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-226419, filed on Nov. 27, 2017, which is hereby incorporated by reference herein in its entirety.

What is claimed is:

1. A vibration type motor comprising:
   a vibrator including a piezo element, a contacting portion, and a holding portion, the vibrator being configured to generate a first vibration and a second vibration;
   a friction member configured to make frictional contact with the contacting portion of the vibrator;
   a holding member configured to hold the holding portion of the vibrator; and
   a biasing member configured to bias the holding portion of the vibrator to the holding member,
   wherein a condition below is satisfied:

$A3/A1 < A4/A2$, where A1 and A2 are respectively amplitudes of the contacting portion in the first vibration and the second vibration, and A3 and A4 are respectively amplitudes of the holding portion in the first vibration and the second vibration in a state where the vibrator is not held by the holding member.

2. The vibration type motor according to claim 1, wherein the holding portion is provided at a position that is a node of the first vibration and that is not a node of the second vibration.

3. The vibration type motor according to claim 1, wherein:
   the first vibration is a vibration in which the contacting portion is displaced in a driving direction of the vibration type motor, and
   the second vibration is a vibration in which the contacting portion is displaced in a direction orthogonal to the driving direction.

4. The vibration type motor according to claim 1, wherein:
   the second vibration is a vibration in which the contacting portion is displaced in a driving direction of the vibration type motor, and
   the first vibration is a vibration in which the contacting portion is displaced in a direction orthogonal to the driving direction.

5. The vibration type motor according to claim 1, wherein the biasing member biases the holding portion to the holding member with a predetermined biasing force so that the vibrator is held by the holding member.

6. The vibration type motor according to claim 1, wherein when the state in which the vibrator is not held by the holding member is a first state, a state in which the vibrator is held by the holding member is a second state, a change amount of a resonance frequency between the first state and the second state in the second vibration is at least twice a change amount of a resonance frequency between the first state and the second state in the first vibration.

7. The vibration type motor according to claim 1, wherein when viewed in a direction orthogonal to a contacting surface of the friction member contacting with the contacting portion, the biasing member overlaps with at least a part of each of the vibrator and the holding member.

8. The vibration type motor according to claim 1, further comprising an adjusting member configured to adjust a biasing force of the biasing member.

9. The vibration type motor according to claim 8, wherein when the state in which the vibrator is not held by the holding member is a first state, a state in which the vibrator is held by the holding member is a second state, the adjusting member adjusts the biasing force so as to adjust a change amount of a resonance frequency between the first state and the second state in the second vibration.

10. An electronic device comprising:
    a vibration type motor; and
    an object configured to be driven by the vibration type motor,
    wherein the vibration type motor comprising:
    a vibrator including a piezo element, a contacting portion, and a holding portion, the vibrator being configured to generate a first vibration and a second vibration;
    a friction member configured to make frictional contact with the contacting portion of the vibrator;
    a holding member configured to hold the holding portion of the vibrator; and
    a biasing member configured to bias the holding portion of the vibrator to the holding member,
    wherein a condition below is satisfied:

$A3/A1 < A4/A2$, where A1 and A2 are respectively amplitudes of the contacting portion in the first vibration and the second vibration, and A3 and A4 are respectively amplitudes of the holding portion in the first vibration and the second vibration in a state where the vibrator is not held by the holding member.

11. The electronic device according to claim 10, wherein the electronic device is a lens apparatus and the object is an optical system.

12. A vibration type motor comprising:
a vibrator including a piezo element, a contacting portion, and a holding portion, the vibrator being configured to generate a first vibration and a second vibration;
a friction member configured to make frictional contact with the contacting portion of the vibrator;
a holding member configured to hold the holding portion of the vibrator; and
a biasing member configured to bias the holding portion of the vibrator to the holding member,
wherein the holding portion is provided at a position that is a node of the first vibration and that is not a node of the second vibration.

13. The vibration type motor according to claim 12, wherein:
the first vibration is a vibration in which the contacting portion is displaced in a driving direction of the vibration type motor, and
the second vibration is a vibration in which the contacting portion is displaced in a direction orthogonal to the driving direction.

14. The vibration type motor according to claim 12, wherein:
the second vibration is a vibration in which the contacting portion is displaced in a driving direction of the vibration type motor, and
the first vibration is a vibration in which the contacting portion is displaced in a direction orthogonal to the driving direction.

15. The vibration type motor according to claim 12, wherein the biasing member biases the holding portion to the holding member with a predetermined biasing force so that the vibrator is held by the holding member.

16. The vibration type motor according to claim 12, wherein when viewed in a direction orthogonal to a contacting surface of the friction member contacting with the contacting portion, the biasing member overlaps with at least a part of each of the vibrator and the holding member.

17. The vibration type motor according to claim 12, further comprising an adjusting member configured to adjust a biasing force of the biasing member.

18. An electronic device comprising:
a vibration type motor; and
an object configured to be driven by the vibration type motor,
wherein the vibration type motor comprising:
a vibrator including a piezo element, a contacting portion, and a holding portion, the vibrator being configured to generate a first vibration and a second vibration;
a friction member configured to make frictional contact with the contacting portion of the vibrator;
a holding member configured to hold the holding portion of the vibrator; and
a biasing member configured to bias the holding portion of the vibrator to the holding member,
wherein the holding portion is provided at a position that is a node of the first vibration and that is not a node of the second vibration.

19. The electronic device according to claim 18, wherein the electronic device is a lens apparatus and the object is an optical system.

* * * * *